3,056,791
ISOQUINOLINE DERIVATIVES
Albert Hofmann, Bottmingen, Basel-Land, and Albert Frey, Riehen, Switzerland, assignors to Sandoz A.G., Basel, Switzerland
No Drawing. Filed Oct. 13, 1960, Ser. No. 62,342
Claims priority, application Switzerland Oct. 27, 1959
6 Claims. (Cl. 260—287)

The present invention relates to novel isoquinoline derivatives and a process for their preparation.

More particularly, the present invention relates to isoquinoline base of the general Formula I,

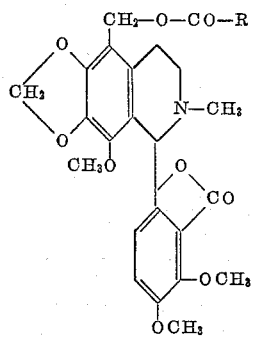

in which R is a member of the class consisting of substituted aryl-, aralkyl-, cycloalkyl- and heterocyclic radical, and the acid addition salts of said base.

The present invention also provides a process for the production of the above base and salts of Formula I, comprising the steps of esterifying N-methyl-5-hydroxymethyl - 6,7 - methylenedioxy - 8 - methoxy - 1 - (dimethoxy-phthalidyl)-1,2,3,4-tetrahydroisoquinoline of the Formula II,

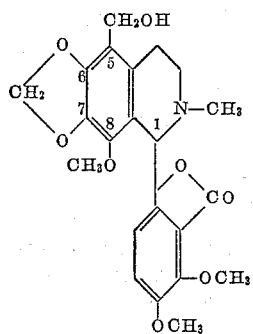

with an acylating agent of acid or corresponding acid halide or anhydride, the acid having the general Formula III $$R\text{—}COOH \qquad \qquad III$$

in which R has the same significance as in Formulae I and II.

An illustrative process of preparation may be effected, for example as follows: N-methyl-5-hydroxymethyl-6,7-methylenedioxy - 8 - methoxy - 1 - (dimethoxy - phthalidyl)-1,2,3,4-tetrahydroisoquinoline is dissolved in an inert, anhydrous organic solvent, for example, chloroform, benzene, or pyridine, and the resulting solution is mixed, at a temperature between —40 to +80° C., with the acid halide or acid anhydride of the acid of the general Formula III, in which R has the above significance, and left to stand for one hour to several days at room temperature, whereafter the resulting ester of the general Formula I may be precipitated with water or otherwise recovered from the reaction mixture.

The novel isoquinoline base of Formula I above forms pharmaceutically acceptable, non-toxic addition salts with organic acids and with mineral acids, e.g., hydrochloric, phosphoric, hydrobromic, sulphuric, citric, oxalic, tartaric, nicotinic, tropic, succinic, maleic, acetic, benzoic, hexahydrobenzoic, methanesulphonic or fumaric acid and also forms quaternary ammonium salts, e.g., methochloride, ethoiodide, etc. by reaction with lower alkyl halide. These salts and quaternary ammonium bases are included in the present invention as are also the pharmaceutical compositions containing them and/or the free bases. The compounds I, their quaternary ammonium bases, and their acid addition salts, specified in the examples hereinbelow are therapeutically useful since they inhibit the cough reflex and act in an unusual manner on the central nervous system.

The compounds of the present invention may be structurally classified as benzylisoquinoline synthetic alkaloids of the opium group.

Natural and semi-synthetic drugs obtained from opium are classified, based on their pharmacologically active alkaloid constituents, into two classes, a first class of phenanthrene derivatives typically comprising natural alkaloids as morphine, codeine and thebaine and a second class of benzylisoquinoline derivatives including papaverine, narcotine and narceine. In the first class, the phenanthrene alkaloids act chiefly on the central nervous system, where a combination of depressant and stimulant effects is produced and another important action is to contract smooth muscles. In sharp contrast, the benzylisoquinoline alkaloids, of the second class, have only insignificant effects on the nervous system and an opposite action, e.g., an antispasmodic action on certain smooth muscles.

The morphine opiates comprise the so-called anodyne expectorants, and codeine of this phenanthrene group in particular is preferred for quieting an overactive cough reflex in an antitussive dose which is kept small (5 to 10 mgm.) because repeated medication may be necessary.

The compounds of the invention possess surprising antitussive characteristics associated ordinarily only with alkaloids of the phenanthrene group, such as codeine, and it would not be expected to have the compounds of the invention to exhibit antitussive activity as a member of the benzylisoquinoline group.

Side effects which occur with papaverine including nausea, abdominal distress, anorexia, constipation, malaise, drowsiness, vertigo, sweating, and headache are largely eliminated with the present compounds.

The oral dose for depressing the cough reflex is 200 to 300 mgm., up to three to four times daily, before meals and at bedtime.

The good oral tolerability of the compounds of the invention is especially to be noted, and this is of great importance for administration in syrupy consistency. Thus, oral administration of the (—)-N-methyl-5-(3′,4′,5′ - trimethoxy - benzoyl - oxymethyl) - 6,7 - methylenedioxy - 8 - methoxy - 1 - (dimethoxy - phthalidyl)-1,2,3,4-tetrahydroisoquinoline to the rabbit shows a tolerability which is at least 14 times better than that of codeine.

The process for the preparation of the starting material, i.e. (—)-N-methyl-5-oxymethyl-6,7-methylenedioxy - 8 - methoxy - 1 - (dimethoxy - phthalidyl) - 1,2,3,4-tetrahydroisoquinoline, may be carried out as follows:

4.22 g. of the 1-narcotine-base are, while stirring, dissolved at room temperature with 2500 cc. of a 36% hydrochloric acid. To that solution 46 g. of p-formaldehyde are added, which, with further stirring, become gradually dissolved. After standing for 10 minutes at room temperature, the whole contents of the flask is heated to 45° for 3 hours while stirring slowly. The reaction mixture is then diluted with 8000 cc. of water and quickly cooled to —10°, whereby the hydrochloride of 5-oxymethyl-narcotine crystallizes out. 539 g. of the hydrochloride, having a melting point of 102–108°, are obtained. In order to liberate the base, there are, for example, suspended 240 g. of hydrochloride in 500 cc. of ethanol and 2000 cc. of water, and then dissolved completely by heating. The clear solution is now cooled well and gradually mixed with a solution of 60 g. of sodium carbonate in 250 cc. of water. The free base crystallizes out, is filtered off and, after drying in a vacuum, has a melting point of 184–186°; $[\alpha]_D^{20}=-105°$ (c.=1.2; $CHCl_3$).

In addition to the esterification with an acid halogene or an acid anhydride of the acid of the general Formula III, acylation may also be carried out with an acid per se. In the latter case the presence of a catalyst, for example, sulfuric acid or hydrochloric acid gas, is necessary.

Illustrative isoquinoline bases under Formula I are the following:

(1) (—)-N-methyl - 5 - (3′,4′,5′-trimethoxy-benzoyl-oxymethyl)-6,7-methylenedioxy-8-methoxy-1-(dimethoxy-phthalidyl)-1,2,3,4-tetrahydroisoquinoline.

(2) (—)-N-methyl-5-(syringoyl-oxymethyl)-6,7-methylenedioxy-8-methoxy-1-(dimethoxy-phthalidyl) - 1,2,3,4-tetrahydroisoquinoline.

(3) (—)-N-methyl-5-(nicotinoyl-oxymethyl)-6,7-methylenedioxy-8-methoxy-1-(dimethoxy-phthalidyl) - 1,2,3,4-tetrahydroisoquinoline.

(4) (—)-N-methyl-5-(tropoyl-oxymethyl)-6,7-methylenedioxy-8-methoxy-1 - (dimethoxy - phthalidyl)-1,2,3,4-tetrahydroisoquinoline.

(5) (—)-N-methyl-5-(8-chloro - theophyllinoyl - oxymethyl)-6,7-methylenedioxy-8-methoxy - 1 - (dimethoxy-phthalidyl)-1,2,3,4-tetrahydroisoquinoline.

(6) (—)-N-methyl-5-(hygrinoyl-oxymethyl)-6,7-methylenedioxy-8-methoxy-1-(dimethoxy-phthalidyl) - 1,2,3,4-tetrahydroisoquinoline.

(7) (—)-N-methyl-5-pyrroloyl-oxymethyl)-6,7 - methylenedioxy-8-methoxy-1-(dimethoxy-phthalidyl) - 1,2,3,4-tetrahydroisoquinoline.

(8) (—)-N-methyl-5-(phthaloyl-oxymethyl)-6,7-methylenedioxy-8-methoxy-1-(dimethoxy-phthalidyl) - 1,2,3,4-tetrahydroisoquinoline.

(9) (—)-N-methyl - 5 - (salicyloyl - oxymethyl)-6,7-methylenedioxy-8-methoxy-1-(dimethoxy - phthalidyl)-1,2,3,4-tetrahydroisoquinoline.

(10) (—)-N-methyl-5-(anthraniloyl-oxymethyl) - 6,7-methylenedioxy-8-methoxy-1-(dimethoxy-phthalidyl) - 1,2,3,4-tetrahydroisoquinoline.

(11) (—)-N-methyl-5-(p-aminobenzoyl-oxymethyl)-6,7-methylenedioxy-8-methoxy - 1-(dimethoxy-phthalidyl)-1,2,34-tetrahydroisoquinoline.

(12) (—)-N-methyl-5-(furoyl-oxymethyl)-6,7-methylenedioxy-8-methoxy-1-(dimethoxy - phthalidyl) - 1,2,3,4-tetrahydroisoquinoline.

(13) (—)-N-methyl-5-(thenoyl-oxymethyl)-6,7-methylenedioxy-8-methoxy-1-(dimethoxy-phthalidyl) - 1,2,3,4-tetrahydroisoquinoline.

In the following examples which illustrate the invention without limiting it, all temperatures are stated in degrees centigrade.

EXAMPLE 1

(—) - N - Methyl-5-(3′,4′,5′,-Trimethoxy-Benzoyl-Oxymethyl)-6,7-Methylenedioxy-8-Methoxy - 1 - (Dimethoxy-Phthalidyl)-1,2,3,4-Tetrahydroisoquinoline 25.4 g. of (—)-N-methyl-5-hydroxymethyl-6,7-methylenedioxy-8-methoxy-1-(dimethoxy-phthalidyl)-1, 2, 3, 4-tetrahydroisoquinoline [melting point 180–183°, $$\alpha_D^{20}=-105°$$

(c.=1.2; $CHCl_3$)] are dissolved in 50 cc. of absolute pyridine and cooled to —30°. A solution of 14.5 g. of 3,4,5-trimethoxybenzoyl chloride in 10 cc. of absolute pyridine is then added while cooling throughout. The reaction mixture is allowed to stand for 2 hours at room temperature and run into 500 cc. of ice water. The required product crystallizes out in the form of woolly needles from water, is filtered off and dried at 80° in a vacuum. Melting point 195–196°, $\alpha_D^{20}=-57°$ (c.=2.0; $CHCl_3$).

EXAMPLE 2

(a) (—)-N - Methyl-5-(5′ - Carbethoxysyringoyl - Oxymethyl)-6,7-Methylenedioxy - 8-Methoxy-1 - (Dimethoxy-Phthalidyl)-1,2,3,4-Tetrahydroisoquinoline 4.43 g. of the starting material of Example 1 are dissolved in 8 cc. of absolute pyridine and cooled to —20°. A solution of 3 g. of 5-carbethoxy-syringoyl chloride in 5 cc. of absolute pyridine is then added while stirring and cooling; the resulting reaction mixture is allowed to stand for 3 hours at room temperature and then run into 200 cc. of ice water. The required product crystallizes out, is filtered off and dried at 60° in a vacuum. Melting point 172–173°; $\alpha_D^{20}=-59°$ (c.=0.3; $CHCl_3$).

(b) (—)-N-Methyl-5-(Syringoyl-Oxymethyl)-6,7-Methylenedioxy-8-Methoxy-1-(Dimethoxy - Phthalidyl)-1,2,3,4-Tetrahydroisoquinoline 2. g. of the end product obtained at (a) are dissolved in 50 cc. of ethanol while hot, 50 cc. of concentrated aqueous ammonia solution (25%) are added and boiling at reflux is effected for 2 hours. On cooling, the required end product crystallizes out; after drying in a vacuum at 80°, it has a melting point of 217–218°, $\alpha_D^{20}=-54°$ (c.=0.3; $CHCl_3$).

EXAMPLE 3

(—)-N-Methyl-5-(Nicotinoyl - Oxymethyl) - 6,7 - Methylenedioxy-8-Methoxy-1-(Dimethoxy-Phthalidyl)-1,2,3,4-Tetrahydroisoquinoline 4.43 g. of the starting material of Example 1 are dissolved in 15 cc. of absolute pyridine, cooling to —20° is effected and a solution of 2 g. of nicotinoyl chloride in 5 cc. of pyridine is added. After standing for 2 hours at room temperature, the pyridine is evaporated in a vacuum, the residue is taken up in methylene chloride and washed with water. After evaporation of the solvent, the required product results; it is recrystallized from methanol; melting point=169–170°; $\alpha_D^{20}=-126°$ (c.=0.3; $CHCl_3$).

We claim:
1. A process for the production of isoquinoline having the Formula I,

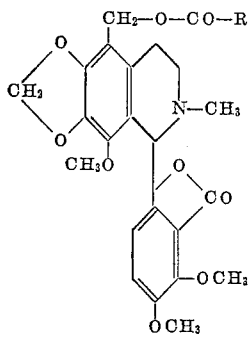

in which R is linked to the carbonyl group by a carbon linkage and is a radical of the group consisting of alkoxy phenyl, pyridyl, tropoyl, theophyllinoyl, pyrroloyl, furoyl, anthraniloyl, phthaloyl, hygrinoyl, amine benzoyl and syringoyl, comprising esterifying N-methyl-5-hydroxymethyl - 6,7 - methylenedioxy-8-methoxy-1-(dimethoxyphthalidyl) - 1,2,3,4 - tetrahydroisoquinoline of the Formula II,

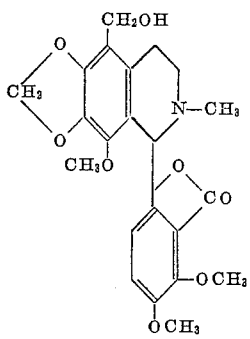

in an inert anhydrous solvent selected from the group consisting of chloroform, benzene and pyridine with an acylating agent of an acid of the Formula III,

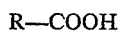  III in which R has the above significance, at a temperature of −40° to +80° C. and separating said product of Formula I.

2. A compound selected from the group consisting of a base having the Formula I

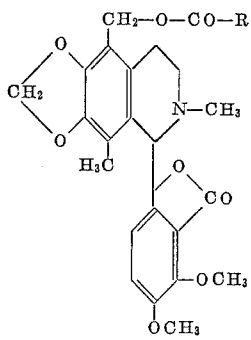  I in which R is linked to the carbonyl group by a carbon linkage and is a radical of the group consisting of alkoxy phenyl, pyridyl, tropoyl, theophyllinoyl, pyrroloyl, furoyl, anthraniloyl, phthaloyl, hygrinoyl, amine benzoyl and syringoyl, pharmacologically acceptable acid addition salts of said base and pharmacologically acceptable lower alkyl quaternary ammonium salts of said base.

3. (−) - N-methyl-5-(3′,4′,5′-trimethoxy-benzoyl-oxymethyl) - 6,7-methylenedioxy-8-methoxy-1-(dimethoxyphthalidyl)-1,2,3,4-tetrahydroisoquinoline.

4. (−) - N - methyl-5-(5′-carbethoxysyringoyl-oxymethyl) - 6,7-methylenedioxy-8-methoxy-1-(dimethoxyphthalidyl)-1,2,3,4-tetrahydroisoquinoline.

5. (−) - N-methyl-5-(syringoyl-oxymethyl)-6,7-methylenedioxy - 8 - methoxy-1-(dimethoxy-phthalidyl)-1,2,3,4-tethahydroisoquinoline.

6. (−) - N-methyl-5-(nicotinoyl-oxymethyl)-6,7-methylenedioxy - 8 - methoxy-1-(dimethoxy-phthalidyl)-1,2,3,4-tetrahydroisoquinoline.

References Cited in the file of this patent

Semansky—Collection of Czechoslovak Chemical Comm., vol. 16, pages 358–65 (1951).